(12) United States Patent
Krupin

(10) Patent No.: US 7,718,147 B2
(45) Date of Patent: May 18, 2010

(54) CHEMICAL BENEFICIATION OF RAW MATERIAL CONTAINING TANTALUM-NIOBIUM

(75) Inventor: Alexander Krupin, Öismä tee (EE)

(73) Assignee: Krupinite Corporation Ltd., Dublin (IE)

( * ) Notice: Subject to any disclaimer, the term of this patent is extended or adjusted under 35 U.S.C. 154(b) by 0 days.

(21) Appl. No.: 11/883,431

(22) PCT Filed: Jan. 24, 2006

(86) PCT No.: PCT/IB2006/001889

§ 371 (c)(1),
(2), (4) Date: Aug. 18, 2008

(87) PCT Pub. No.: WO2006/136948

PCT Pub. Date: Dec. 28, 2006

(65) Prior Publication Data

US 2009/0202405 A1    Aug. 13, 2009

(30) Foreign Application Priority Data

Feb. 3, 2005  (BR) .................................. 0500778

(51) Int. Cl.
*B01D 11/00*    (2006.01)

(52) U.S. Cl. ................ 423/20; 423/3; 423/67; 423/68; 423/220; 423/235; 423/237; 423/253; 423/259; 423/594.17

(58) Field of Classification Search ............ 423/3, 423/20, 67, 68, 220, 235, 237, 253, 259, 423/594.17
See application file for complete search history.

(56) References Cited

U.S. PATENT DOCUMENTS

| 4,451,438 A | 5/1984 | Floeter |
| 7,282,187 B1 * | 10/2007 | Brown et al. ............... 423/21.5 |

FOREIGN PATENT DOCUMENTS

| EP | 1 245 685 | 10/2002 |
| GB | 837 110 | 6/1960 |
| WO | WO00/24943 | 5/2000 |

* cited by examiner

*Primary Examiner*—Melvin C Mayes
*Assistant Examiner*—Melissa Stalder
(74) *Attorney, Agent, or Firm*—Thorpe North & Western LLP

(57) ABSTRACT

The invention relates to a process for the chemical beneficiation of raw material containing tantalum-niobium such as wastes, scoria, concentrates and ores.

15 Claims, No Drawings

CHEMICAL BENEFICIATION OF RAW MATERIAL CONTAINING TANTALUM-NIOBIUM

FIELD OF THE ART

The invention relates to a process for chemical beneficiation of raw material containing tantalum-niobium, such as wastes, waste, concentrates and ores.

DESCRIPTION OF THE PRIOR ART

Almost all known kinds of tantalum raw materials used in extraction of tantalum and niobium known in the production scale until now contain a large amount of natural uranium the form of $U_3O_8$—a natural mixture of uranium (4) and uranium (6). Sometimes the uranium content in the raw materials containing tantalum-niobium is higher than 0.5%. In this case, the same concentrates are classified as concentrates containing uranium and are treated as concentrates containing uranium by means of known technologies with chemical oxidants and with the obtainment of soluble salts of uranyl and wastes containing tantalum-niobium.

According to the hydrometallurgical process known for treating tantalum-niobium raw material containing not more than 0.5% natural $U_3O_8$ based on the decomposition stage with hydrofluoridric acid or with mixture of hydrofluoridric acid and other mineral acid, the uranium (4) is extracted in the form of a insoluble uranium tetrafluoride $UF_4$ salt together with insoluble residues of elements of the mixture. At the same time, uranium (6) is transformed into the soluble salts of $UO_2^{2+}$ ion and tantalum and niobium are purified from the medium only in the multiple stages of the liquid-liquid extraction with organic solvents.

Uranium (6) in the form of soluble salts of uranyl $UO_2^{2+}$ is extracted from the acidic solution of the waste together with insoluble residues of the elements of the mixture in the acid-base neutralization process with calcium hydroxide.

Document PCT/SE99/01888 describes a process for treating raw materials containing tantalum and/or niobium present in wastes, scoria, concentrates and ores, which are processed by repeated uses of a ammonium-fluoride solution. The final product thus obtained contains tantalum and niobium with considerable uranium contents, so that it will be considered a radioactive product. Additionally and unlike the present invention, as well be seen later, said process does not describe additional steps that should be carried out to separate uranium from the other elements by washing out sediments containing uranium, after the step of washing sediments of element compounds in mixture with an ammonium-fluoride solution or water or ammonia solution.

The present invention eliminates or reduces the drawbacks mentioned above by chemical beneficiation of the raw material containing tantalum-niobium with the obtainment of the mixture of titanium oxides and niobium in the form of a chemical concentrate free from a large amount of the natural radioactive elements. The process of the present invention uses carbonate ions that influence in separating uranium from a mixture having tantalum and niobium. Consequently, the final product advantageous contains tantalum and niobium with acceptable uranium contents, being therefore considered a non-radioactive product.

BRIEF DESCRIPTION OF THE INVENTION

The present invention describes a process for the beneficiation of chemical a raw material containing tantalum, niobium, uranium and other elements in mixture, which comprises the following steps:

A. The raw material is decomposed by a solution containing ammonium-fluoride carbonate in a reducing medium at the boiling point of the reaction mixture for no longer than 8 hours; said tantalum, niobium and other elements in mixture of said raw material are converted into complexes of ammonium fluoride; uranium (6) is reduced to uranium (4) and the combination with uranium (4) of the raw material is converted to uranium tetrafluoride $UF_4$ or ammonium uranium fluoride $NH_4UF_5$; exhaust gases from said decomposition consist of ammonia, ammonium fluoride and carbon dioxide, which are recovered by condensation and scrubbing of the exhaust gases;

B. The mixture obtained as a result of the decomposition step according to step A is leached with water, or a solution containing ammonia or a solution containing ammonium fluoride for no longer than 1 hour, without keeping the leaching temperature to remove said ammonium-fluoride complex compounds in said water or solutions, leaving the insoluble compounds of the mixture elements.

C. The mixture obtained in step B is filtered, producing a main filtrate that is an ammonium-fluoride solution containing tantalum and niobium and a sediment of compounds of the mixture elements; said sediment is washed with an ammonium-fluoride solution, water or ammonium solution;

D. The main filtrate of step C is mixed with an ammonium carbonate solution to precipitate tantalum and niobium;

E. A sediment containing tantalum and niobium precipitated during step D is separated from the carbonate-containing solution of ammonium fluoride by filtration and then dried and calcinated at a temperature ranging from 450 to 900° C. to obtain the mixture of tantalum and niobium oxides, which are the final product and are suitable further treating it by a known process of extraction and separation of tantalum and niobium; a filtrate and a washing/scrubbing solution are combined and recycled as a carbonate-containing solution of ammonium fluoride for decomposition of the raw material according to step A.

The reducing medium according to step A is formed by using partly dissociated ammonium.

The ammonium transformed to the gas phase during step A, as defined above, is partly dissociated on the surface of the fluoride compounds of elements also formed during the decomposition of the raw materials.

The ammonium-fluoride solution recovered in scrubbing the exhaust gases in step A is used for leaching in step B of the process.

The 1.0-1.5% ammonium carbonate solutions recovered in step A are used for leaching in step B of the process.

The 1.0-1.5% ammonium carbonate solutions recovered in step A are used for washing sediments of mixture elements in step C of the process.

The 1.0-28% ammonium carbonate solutions recovered in step A are used for ammoniac-carbonic precipitation and washing sediments of tantalum and niobium in step D of the process.

The sediment of the compounds of elements in mixture separated in step C is suitable for additional treatment thereof by using the known process with chemical oxidants so as to recover uranium.

The solution obtained in step C of the process, upon the washing of the sediments of impurities, is used during step A of the process as ammonium-fluoride solution.

The salts of ammonium fluoride in solid form or in dissolved form are added in step A of decomposition of the raw material for replacing the contents of fluoride ions.

The salts of soluble carbonate in solid form or in dissolved form are added in step A of decomposition of the raw material for replacing the carbonate-ion contents.

DETAILED DESCRIPTION OF THE INVENTION

According to the present invention, the raw material containing tantalum-niobium is processed in a reducing medium by using a solution containing ammonium-fluoride carbonate, recovered from the process at a temperature of up to the boiling point (239° C.) for no longer than 8 hours (examples 1 and 3).

It not advisable to raise the temperature and to increase the decomposition time. If the temperature is raised and the decomposition time is longer than 8 hours, this leads to intensive extraction of ammonium fluoride out of the reaction zone and into a gas phase. This will complicate the gas-scrubbing process.

The amounts of ammonium fluoride necessary to decompose the tantalum-niobium raw material is calculated on the basis of the formation of the complex compounds of ammonium fluoride of all the elements that are included in the structure of the given raw materials. In order to achieve the total decomposition of the raw material, it is advisable to use an excess ammonium fluoride.

The amount of carbonate ions necessary to decompose the tantalum-niobium raw material is calculated on the basis of the formation of complex compounds of uranyl $[UO_2(CO_3)_3]^4$ ion carbonate. However, it is advisable to use an excess carbon ion.

In the step of decomposing the ammonia, ammonium fluoride and carbon dioxide are changed into the gas phase, as follows:

ammonia is formed while the elements of the oxides that the raw materials contain undergo fluorination, due to the heat decomposition of the complex compounds of ammonium carbonate of, for example, uranyl ions, formed during the treatment of the raw materials and in the process of transition from ammonium fluoride to ammonium hydrofluoride when the ammonium fluoride solution is evaporated during the decomposition process;

ammonium fluoride is changed into the gas phase due to the heat decomposition of complex compounds of ammonium fluoride of the mixture elements formed during the treatment of the raw materials;

carbon dioxide is changed into the gas phase due to the heat decomposition of the complex compounds of ammonium carbonate of, for example, uranyl ion, formed during the treatment of the raw materials.

The reducing medium of the decomposition process is formed by means of partly dissociated ammonium.

The partial dissociation of ammonium changed into the gas phase during the decomposition process is carried out on the surface of the fluoride compounds of the elements formed during the treatment of the raw materials.

The necessary treatment time no longer than 8 hours is sufficient for the decomposition of the raw materials and for the reduction of the uranyl ions activated by preparing its carbonate form during the step of decomposition into uranium (4) with the obtainment of its insoluble salts of uranium tetrafluoride $UF_4$ and ammonium uranium fluoride $NH_4UF_5$.

The decomposition process is carried out until the total transformation of carbonate ion to the gas phase in a form of carbon dioxide.

From the gas phase, ammonia and carbon dioxide are recovered as 1.0-28% ammonium carbonate solution by the condensation method (solutions (1.4); (1.5); (3.4) an (3.7) in examples 1 and 3) and it is repeatedly used during the ammoniac-carbonic precipitation and during the washing of the precipitate containing tantalum-niobium (example 2), and also during the washing of the sediments of the mixture elements (examples 1 and 3).

The ammonium fluoride is recovered from the gas phase by the condensation method and absorption of an aqueous solution containing ammonium fluoride in an amount of about 10-25% (solutions (1.6) and (3.6) in examples 1 and 3) and it is repeatedly used during the decomposition as an ammonium fluoride solution and during the lixiviation step after the decomposition (examples 1 and 3).

The reaction mixture as a result of the decomposition step is leached by using any aqueous solution recovered during no longer than 1 hour, without keeping the temperature of the leaching process.

The leached slurry is filtered, obtaining the main filtrate containing the soluble ammonium fluoride complex compounds of tantalum and niobium and also partial soluble ammonium fluoride complex compounds of the mixture elements.

Most of the mixture elements contained in the raw material is extracted as almost insoluble oxides, oxide fluorides or fluorides that, after the washing are suitable for recovery of uranium from the medium by a known hydrometallurgical process with chemical oxidants. Also the sediment of the mixture elements after calcinations is a waste product capable of being removed.

The washing solutions (1.2) and (3.2) are suitable for use in the step of decomposition of the raw materials as an ammonium fluoride solution (example 3).

From the aqueous solution containing pure tantalum and niobium, the mixture of titanium and niobium oxides and oxide fluorides is consistently extracted in solid condition (example 2):

by the ammoniac-carbonic neutralization process with the aid of the circulation of 20-28% of the ammonium carbonate solution recovered during the scrubbing of the composition from exhaust gases. The amount of carbonate ion required for the precipitation step should be larger than $CO_3^{2+}/UO_2^{2+}=3$, which means that it should be sufficient for preparing the soluble complex compound $[UO_2(CO_3)_3]^{4-}$. To compensate for the losses of carbonate ion, solid ammonium carbonate, sodium carbonate or another carbonate salt are added to the pure solution of tantalum and niobium or to the circulating ammonium-carbonate solution prior to precipitation. The precipitation time is not longer than 1 hour. The precipitation temperature is not kept and is raised up to 80-100° C. during the neutralization process.

By washing with the aid of 1.0-1.5% ammonium carbonate solutions recovered during the scrubbing of the composition from exhaust gases from decomposition and also by drying/calcinations at a high temperature of 450/900° C. of the precipitate containing tantalum-niobium. The obtained mixture of tantalum and niobium oxides and oxide fluorides is a final product of the chemical beneficiation process (sediment (2.2) in example 2).

The combination of the main filtrate and the washing solution is a solution containing ammonium fluoride carbonate (solution 2.1) example 2), which is neutralized in the step of decomposing the raw material containing tantalum-niobium (example 3).

Example 1

1.0 kg of tantalum-niobium raw material containing 0.95% of $Ta_2O_5$, 34.67% of $Nb_2O_5$, 0.34% of $U_3O_8$, 3.26% of $ThO_2$ and other impurities was processed by a mixture of 0.763 liter of water, 1500 g of ammonium fluoride and 30 g of ammonium carbonate salt at a temperature not higher than 239° C. (the boiling point) in the reducing medium in 4 hours. The thus obtained mixture was leached with 1.694 liter of water and 0.8 liter of a solution (1.6) containing 174 g of ammonium fluoride in 1 hour. After leaching, the fluoride solution was separated by filtration from the insoluble precipitate, which was washed by 1.836 liters of a solution containing 28.3 g of ammonia. After the washing, the insoluble sediment of impurities was dried/calcinated at the temperature of 450-900° C. in 1 hour.

As a result:

1.1-2.65 liters of a main filtrate containing 8.2 g of $Ta_2O_5$; 300.6 g of $Nb_2O_5$; 0.03 g of $U_3O_8$ and 78.6 g of other impurities;

1.2-1.86 liters of a washing solution containing 0.22 g of $Ta_2O_5$; 44.4 g of $Nb_2O_5$, 0.05 g of $U_3O_8$ and 54.6 g of other impurities;

1.3-0.638 kg of dried insoluble sediment of impurities containing 1.04 g of $TaO_5$; 1.68 g of $Nb_2O_5$; 3.32 g of $U_3O_8$ and 32.6 g of $ThO_2$.

The following solutions were released from the gas phase by condensation at different temperatures and in different stages of decomposition:

1.4-0.54 liter of a solution containing 108.2 g of ammonia and 15 g of carbonate ion;

1.5-0.292 liter of a solution containing 48.8 g of ammonia;

1.6-0.8 liter of a solution containing 174 g of ammonium fluoride.

Example 2

2.65 liters of a tantalum-niobium solution (1.1) (example 1) were processed by a mixture of 0.54 liters of solution (1.4) containing 108.2 g of ammonia and 15 g of carbonate ion and 0.528 liter of the solution containing 105.7 g of ammonia in not longer than 1 hour without maintaining the temperature. After neutralization, the sediment was separated by filtration from the mother-liquor and then calcined at a temperature of 450-900° C. in not longer than 2 hours. The mother liquor and the solution were combined after the scrubbing of the exhaust gases.

The following was obtained:

2.1-3.969 liters of a solution containing ammonium fluoride carbonate containing 1095 g of ammonium fluoride, 15 g of carbonate ion and about 0.018 g of $U_3O_8$;

2.1-393.2 g of tantalum-niobium sediment containing 8.2 g of $Ta_2O_5$; 300.6 g of $Nb_2O_5$; about 0.012 g of $U_3O_8$ and 84.4 g of other impurities. The sediment contents: 2.08% of $Ta_2O_5$; 76.5% of $Nb_2O_5$; <0.01% of $U_3O_8$ and 21.5% of other impurities.

Example 3

1.0 kg of tantalum-niobium raw material containing 0.95% of $Ta_2O_5$, 34.67% of $Nb_2O_5$, 0.34% of $U_3O_8$, 3.26% of $ThO_2$ and other impurities was processed by a mixture of 1.86 of the solution (1.2) (example 1), 3.969 liters of the solution (2.1) (example 2) and 441 g of solid ammonium hydrofluoride at a temperature hot higher than 239° C. (the boiling point) in the reducing medium in 8 hours. The thus obtained mixture was leached by a mixture of 0.379 liter of water, 0.292 liter of a solution (1.5) (example 1) and 1,876 liter of a solution (3.6) example 3) in 1 hour. After the leaching, the fluoride solution was separated by filtration of the insoluble precipitate, which was washed by 1,863 liters of the solution (3.4) (example 3). After the washing, the insoluble sediment of impurities was dried/calcined at the temperature of 450-900° C. in 1 hour.

As a result:

3.1-2.66 liters of a main filtrate containing 8.42 g of $Ta_2O_5$; 339 g of $Nb_2O_5$; 0.031 g of $U_3O_8$ and 50.26 g of other impurities;

3.2-1.89 liter of a washing solution containing 0.06 g of $Ta_2O_5$; 50 g of $Nb_2O_5$; 0.05 g of $U_3O_8$ and 61.2 of other impurities;

3.3-0.708 kg of dried insoluble sediment of impurities containing 1.23 g of $TaO_5$; 1.97 g of $Nb_2O_5$; 3387 g of $U_3O_8$ and 32.6 g of $ThO_2$.

The following solutions were released from the gas phase by condensation at different temperature and in different stages of decomposition:

3.4-1.863 liter of a solution containing 36.8 g of ammonia;

3.5-1.66 liter of a solution containing 331 g of ammonia and about 15 g of carbonate ion;

3.6-1.876 liter of a solution containing 175 g of ammonium fluoride;

3.7-0.338 liter of a solution containing 50.38 g of ammonia.

The invention claimed is:

1. A process for chemical beneficiation of raw material containing tantalum, niobium, uranium and other elements in mixture, comprising the following steps:

(A) the raw material is decomposed by a carbonate-containing solution of ammonium fluoride in a reducing medium at the boiling point of the reaction mixture for no longer than 8 hours wherein said tantalum, niobium and other elements in a mixture of said raw material are converted into complex compounds of ammonium fluoride wherein uranium-6 is reduced to uranium-4 and the combination with uranium-4 found in the raw material is converted to uranium tetrafluoride ($UF_4$) or ammonium uranium fluoride ($NH_4UF_5$) wherein exhaust gases from said decomposition include ammonia, ammonium fluoride and carbon dioxide, which are recovered by condensation and scrubbing of the exhaust gases;

(B) the mixture obtained as a result of the decompositions step according to step A is leached with water, or a solution containing ammonia or a solution containing ammonium fluoride for no longer than 1 hour, without keeping the leaching temperature to remove said ammonium-fluoride complex compounds in said water or solutions, leaving the insoluble compounds of the mixture elements;

(C) the mixture obtained in step B is filtered, producing a main filtrate that is an ammonium-fluoride solution containing tantalum and niobium and a sediment of compounds of the mixture elements and said sediment is washed with an ammonium-fluoride solution, water or ammonium solution;

(D) the main filtrate of step C is mixed with an ammonium carbonate solution to precipitate tantalum and niobium; and (E) a sediment containing tantalum and niobium precipitated during step D is separated from the carbonate-containing solution of ammonium fluoride carbonate by filtration and then dried and calcinated at a temperature ranging from 400 to 900° C. to obtain the mixture of tantalum and niobium oxides, which are the final product and are suitably further treated by a known process of extraction and separation of tantalum and niobium; a filtrate and a washing/scrubbing solution are combined and recycled as a solution containing ammonium fluoride carbonate for decomposition of the raw material according to step A.

2. A process according to claim 1, characterized in that the reducing medium, during the step A, is formed by using the partly dissociated ammonium.

3. A process according to claim 2, characterized in that the ammonium changed to the gas phase during the step A is partly dissociated on the surface of the fluoride compounds of elements also formed during the decomposition of the raw materials.

4. A process according to claim 1, characterized in that the ammonium fluoride solution recovered in the scrubbing of exhaust gases in step A is used for leaching in step B of the process.

5. A process according to claim 1, characterized in that 1.0-1.5% ammonium carbonate solutions recovered in step A are used for leaching in step B of the process.

6. A process according to claim 1, characterized in that 1.0-1.5% ammonium carbonate solutions recovered in step A are used for washing sediments of mixture elements in step C of the process.

7. A process according to claim 1, characterized in that 1.0-28% ammonium carbonate solutions recovered in step A are used for ammoniac-carbonic precipitation and washing of tantalum and niobium sediments in step D of the process.

8. A process according to claim 1, characterized in that the sediment of the compounds of elements in mixture separated in step C is suitable for further treatment thereof by using a known process with chemical oxidants so as to recover the uranium.

9. A process according to claim 1, characterized in that the solution obtained in step C of the process, upon washing the sediment of impurities, is used during the step A of the process as ammonium fluoride solution.

10. A process according to claim 1, characterized in that the ammonium fluoride salts in solid form or in dissolved form are added in the step A of decomposition of the raw material to replace the fluoride-ion contents.

11. A process according to claim 1, characterized in that the soluble carbonate salts in solid form or in dissolved form are added in the step A of the decomposition of the raw material to replace the carbonate-ion contents.

12. A process for chemical beneficiation of raw material containing tantalum, niobium, uranium and other elements in mixture, comprising the following steps:

(A) decomposing the raw material using a carbonate-containing solution of ammonium fluoride in a reducing medium up to a boiling point of the mixture for no longer than 8 hours so as to form a decomposed mixture of soluble complexes of niobium and tantalum with ammonium fluoride, insoluble uranium tetrafluoride or ammonium uranium fluoride, and exhaust gases;

(B) leaching the decomposed mixture for no longer than 1 hour sufficient to remove the soluble complexes as a leachate leaving the insoluble uranium compounds;

(C) filtering the leachate to form an ammonium-fluoride filtrate containing tantalum and niobium and a sediment;

(D) precipitating tantalum and niobium from the filtrate using ammonium carbonate to form a tantalum-niobium precipitate; and (E) drying and calcining the tantalum-niobium precipitate to form tantalum oxides and niobium oxides.

13. The process of claim 12, wherein the reducing medium is formed by partly dissociated ammonium.

14. The process of claim 12, further comprising recycling the filtrate subsequent to step (D) as the carbonate-containing solution.

15. The process of claim 12, further comprising scrubbing the exhaust gases and recycling the exhaust gases as part of the leaching.

* * * * *